United States Patent
Rice

(10) Patent No.: US 10,300,941 B2
(45) Date of Patent: May 28, 2019

(54) MOTOR DRIVE AND CONTROL CIRCUIT FOR ELECTRIC POWER STEERING

(71) Applicant: TRW Limited, Solihull, West Midlands (GB)

(72) Inventor: Nathanael Rice, Edwalton (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/834,146

(22) Filed: Dec. 7, 2017

(65) Prior Publication Data

US 2018/0154930 A1 Jun. 7, 2018

(30) Foreign Application Priority Data

Dec. 7, 2016 (GB) .................................. 1620837.3

(51) Int. Cl.
*H02P 25/18* (2006.01)
*B62D 5/04* (2006.01)
(Continued)

(52) U.S. Cl.
CPC ........... *B62D 5/0463* (2013.01); *B62D 5/046* (2013.01); *B62D 5/0406* (2013.01); *H02P 5/51* (2016.02); *H02P 5/74* (2013.01); *H02P 25/00* (2013.01)

(58) Field of Classification Search
CPC combination set(s) only.
See application file for complete search history.

(56) References Cited

U.S. PATENT DOCUMENTS 3,757,182 A * 9/1973 Chalmers ............... H02K 19/16
  310/210
3,845,374 A * 10/1974 Clarady ............... H02M 7/1557
  318/445

(Continued)

OTHER PUBLICATIONS

UK Search Report, Application No. GB1620837.3 dated May 30, 2017.

*Primary Examiner* — Bentsu Ro
(74) *Attorney, Agent, or Firm* — MacMillan, Sobanski & Todd, LLC

(57) ABSTRACT

An electric circuit for use in the control and drive of at least one electric motor, the circuit comprises a first lane comprising a first set of motor windings that are driven by a motor drive bridge that comprises a network of drive stage switches that selectively connect each phase of the lane to either a first supply voltage or a first supply ground, and further comprising a control circuit that controls the switches of the drive stage, the control circuit being powered by an isolated first lane power supply that has a first floating ground, and a second lane comprising a second set of motor windings that are driven by a motor drive bridge that comprises a network of drive stage switches that selectively connect each phase of the lane to either a supply voltage or a supply ground, and further comprising a control circuit that controls the switches of the drive stage, the control circuit being powered by an isolated second lane power supply that has a second floating ground. The first and second control circuits in use exchange digital control signals such that the control circuit of each lane can monitor the function of the other lane, and the two floating grounds and the two lane grounds are connected together through a potential divider network that holds the two floating grounds at a potential that is between the potential of the lane grounds for the two lanes.

18 Claims, 5 Drawing Sheets

(51) Int. Cl.
*H02P 25/00* (2006.01)
*H02P 5/51* (2016.01)
*H02P 5/74* (2006.01)
*H02P 25/22* (2006.01)

(56) References Cited

U.S. PATENT DOCUMENTS

| | | | | |
|---|---|---|---|---|
| 3,999,104 | A | * 12/1976 | Lardennois | G01R 31/00 |
| | | | | 361/88 |
| 5,760,587 | A | 6/1998 | Harvey | |
| 2004/0264075 | A1 | 12/2004 | Kolomeitsev | |
| 2005/0257992 | A1* | 11/2005 | Shiino | B62D 5/04 |
| | | | | 180/444 |
| 2011/0074323 | A1 | 3/2011 | Mukai | |
| 2011/0156629 | A1 | 6/2011 | Satou et al. | |
| 2011/0163708 | A1 | 7/2011 | Mukai et al. | |
| 2014/0313623 | A1 | 10/2014 | Huber | |

\* cited by examiner

MOTOR DRIVE AND CONTROL CIRCUIT FOR ELECTRIC POWER STEERING

CROSS-REFERENCE TO RELATED APPLICATIONS

This application claims priority to Britain Patent Application No. 1620837.3, filed 7 Dec. 2016, the disclosures of which are incorporated herein by reference in entirety.

BACKGROUND OF THE INVENTION

This invention relates to motor drive and control circuits for electric motors, in particular for use in an electric power steering system.

Electric power steering systems are known where an electric motor applies a torque to assist the driver in turning the steering wheel, the amount of torque being dependent on the amount of torque applied to the steering wheel by the driver. A torque sensor is provided that measures the torque in the steering, typically in the steering shaft, and a microprocessor determines a torque demand signal for the motor dependent upon the measured torque as set by a defined boost curve. This demand signal is supplied to a motor controller which generates a motor drive signal that is passed to a motor drive circuit. The motor drive circuit modulates the switches of a motor drive stage which in turn controls the current flowing through the phases of the motor. The actual current flowing in the motor may be measured using a current sensor, or estimated in a sensorless control system, and this may be fed back into the controller to provide a closed loop control of the motor.

To provide resilience the motor may be provided with two sets of windings, each independent of the other, and each being driven by a respective drive circuit. In normal use only one drive circuit and set of windings may be used to drive the motor, but when a fault is detected the circuit can switch over to use the other set of windings and drive circuit. Alternatively, both sets of windings can be driven in normal use and when a fault occurs with one then the remaining set of windings can continue to drive the motor. This is known as a dual lane system. In one arrangement, each drive circuit can be controlled by a respective separate control circuit, and each control circuit can be supplied with power from its own separate power supply.

A similar resilience can be achieved by using two mechanically linked motors, each one being provided with one of the two lanes of the dual system.

Providing two lanes allows the motor (or one of a pair) to continue to provide assistance after a fault. In order to achieve greater availability after the first fault, high levels of flexibility between the lanes needs to be achieved so that failures of significant portions of the circuit can be mitigated without reducing the capability of the design. This will require increased numbers of signals to be sent between the lanes to permit each lane to take over more of the functionality of the failed lane. A lane needs to be able to monitor the signals from the other lane in order to identify that it needs to take over.

BRIEF SUMMARY OF THE INVENTION

A feature of the present invention is to ameliorate some of the problems associated with dual lane isolated power supply control and drive circuits for electric power steering systems.

According to a first aspect, the invention provides an electric circuit for use in the control and drive of at least one electric motor, the circuit comprising:

a first lane comprising a first set of motor windings that are driven by a motor drive bridge that comprises a network of drive stage switches that selectively connect each phase of the lane to either a first supply voltage or a first supply ground, and further comprising a control circuit that controls the switches of the drive stage, the control circuit being powered by an isolated first lane power supply that has a first floating ground, a second lane comprising a second set of motor windings that are driven by a motor drive bridge that comprises a network of drive stage switches that selectively connect each phase of the lane to either a supply voltage or a supply ground, and further comprising a control circuit that controls the switches of the drive stage, the control circuit being powered by an isolated second lane power supply that has a second floating ground, the first and second control circuits in use exchanging digital control signals such that the control circuit of each lane can monitor the function of the other lane, and wherein the two floating grounds and the two lane grounds are connected together through a potential divider network that holds the two floating grounds at a potential that is between the potential of the lane grounds for the two lanes.

By providing two isolated power supplies, with one for each lane, but tying the floating grounds together using a potential divider linked to the two lane grounds, the applicant has appreciated that the two control circuits can exchange signals between them which would otherwise not be possible without the use of digital isolation devices. The two lane grounds will typically be connected to a common earth, such as a part of a vehicle chassis where the circuit is part of a vehicle.

The potential divider may comprise a first resistance connecting the floating ground of the first lane to the associated first ground for the first lane, a second resistance connecting the floating ground of the second lane to the associated second ground for the second lane, and a third resistance connecting the two floating grounds together.

The first resistance and the second resistance may each be higher than the third resistance, and may be at least 5 times, or at least 10 times as high, or at least 100 times as high. These resistance values ensure that both of the floating grounds are held at a similar potential even when there are differences in potential on the two ground lines. These differences may occur due to noise or sudden voltage surges associated with the first and second power supplies.

The first resistance and the second resistance may be the same, or substantially the same. This will ensure the potential of the two floating grounds is close to midway between the potential of the two lane grounds.

The circuit of the invention may be arranged so that the potential divider includes one or more Zener diodes which prevent the voltage of a floating ground of a lane deviating from the potential of the associated earth of the lane by an amount that exceeds a predetermined maximum dependent on the breakdown voltage of the Zener diode.

In a preferred arrangement a first Zener diode is provided in parallel with the first resistance to provide a voltage limiting circuit and a second Zener diode is provided in parallel with the second resistance, ensuring that the potential of each floating ground will be limited to have a value that is tied to the potential of the respective lane ground by an amount that is dependent on the breakdown voltage of the Zener Diode.

Rather than one Zener diode in parallel with the first resistance, two may be provided which are connected facing away from each other in series. This limits the voltage that can be dropped when the first ground potential is above the second ground potential and also protect when the first ground potential is below the second ground potential, in each case to an amount equal to the forward bias voltage of one Zener diode and breakdown voltage of the other Zener diode. The same may be applied to the second resistance, with two Zener diodes connected so they face away front each other and the chain of two together connected in parallel across the second resistance.

The Zener breakdown voltage of each Zener diode may be chosen to be less than the common mode range of any components used in the bridge driver of the respective lane. For example, the breakdown voltage may be approximately 1.5 volts. Where two are reverse connected, the breakdown voltage of one and forward bias voltage of the other should be chosen to be less than the common mode range of any of the components of the bridge driver.

Typically the bridge driver may comprise a bridge driver integrated circuit that includes a differential amplifier having a common mode range and the Zener breakdown voltage may be chosen to suit the integrated circuit amplifier.

The control circuit of the first lane may receive digital signals from the control circuit of the second lane and also transmit digital signals to the control circuit of the second lane. The control circuit of the second lane may receive digital signals from the control circuit of the first lane and also transmit digital signals to the first lane. By holding the potential of the two floating grounds at a similar potential, the digital signals can easily be interpreted by the respective control circuits, whereas if the two floating grounds were not connected then in the case of a wide variation in the potential of the lane grounds the signals may otherwise become unintelligible. Being able to exchange simple digital signals makes the communications between the two lanes relatively simple to implement.

Each of the isolated power supplies may comprise a transformer having an input coil connected to the respective lane supply, and an output coil which produces across its terminals the supply and floating ground potentials for the respective lane.

Each of the isolated power supplies may provide at an output two different supply voltages, for example a 6 volt potential and a 2 volt potential, that are fed to different parts of the control circuit.

The output of each isolated power supply may pass through a voltage regulator before supplying the respective control circuit.

Each of the isolated power supplies may additionally include an auxiliary independent set of output windings to provide an auxiliary supply voltage that may be used to drive the control circuit of the other lane in the event of a fault of the isolated supply for that other lane.

The power supplies for each lane may provide the same supply voltage or different supply voltages. For example one may provide a nominal 48 volt supply and the other a nominal 12 volt supply. They may comprise battery supplies, especially where the circuit is fitted to a vehicle.

The circuit may include at least one sensor that is shared between the two control circuits and which is powered from a third isolated power supply and has a ground that is floating at a voltage dependent on at least one of the first and second floating grounds. This may receive power from a further output coil from at least one of the first and second isolated power supplies for the first and second lane.

The control circuit may include a circuit that generates a set of motor phase voltages as a function of the torque, a torque demand signal and a measure of the current in the motor windings.

The circuit may comprise a part of a vehicle electric power steering system in which the motor applies an assistance torque to a part of a vehicle steering assembly that assists a driver in turning the steering wheel of the vehicle. The motor may be connected to the steering assembly through a gearbox.

The at least one sensor may comprise a torque sensor that senses the torque carried, by a part of a steering system to which the motor is connected, or a motor position sensor.

Other advantages of this invention will become apparent to those skilled in the art from the following detailed description of the preferred embodiments, when read in light of the accompanying drawings.

DETAILED DESCRIPTION OF THE INVENTION

Figure 1:
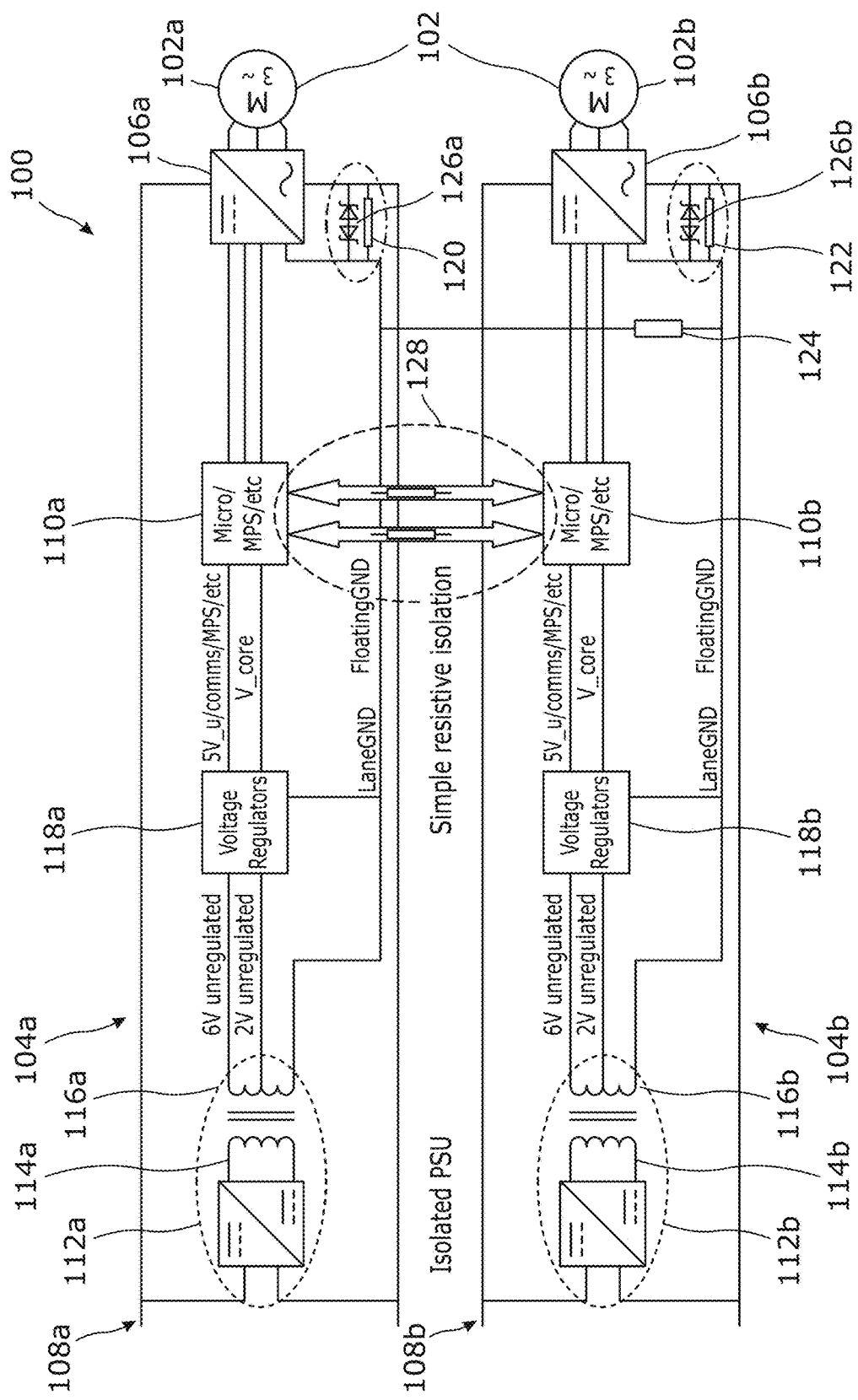
FIG. 1 is a first embodiment of a circuit for controlling and driving an electric motor of an electric power assisted steering system for a vehicle.

FIG. 1 shows a dual lane control and drive circuit 100 for a dual wound electric motor 102. The invention may also be applied, to an arrangement with two motors that are mechanically linked. In each case, the two lanes 104a, 104b ensure that there is a degree of redundancy in the event of a fault in one lane 102a, 102b of the motor 102, or in one of a pair of linked motors, or in the circuitry used to control, or drive each lane. In the embodiment, as with the embodiments of FIGS. 2 to 5, the motor 102 is used on a vehicle such as a car, for example as part of an electric power assisted steering assembly in which the motor 102 applies an assistance torque to the steering that helps the driver turn the steering wheel. When used in an automotive application the power supply for the circuit 100 is derived from one or more batteries fitted to the vehicle.

The motor 102 comprises for each lane 102a, 102b a set of phase windings, typically three phases as shown in FIG. 1. To drive the motor 102 the windings of each phase are connected to a respective lane 104a, 104b of a bridge driver circuit 100. The first lane 104a comprises one bridge driver circuit 106a having three upper switches connected to a supply voltage from a first power supply 108a, and three lower switches connected to a ground line for the first power supply 108a. Similarly, the second lane 104b comprises one bridge driver circuit 106b having three upper switches connected to a supply voltage from a second power supply 108b, and three lower switches connected to a ground line for the second power supply 108b. As shown the two power supplies 108a, 108b provide nominally the same voltage of 12 volts. Indeed, they may both be derived from a common battery fitted to the vehicle.

The bridge driver 106a of the first lane 104a is controlled by a first control circuit 110a indicated in FIG. 1 as microprocessor (micro). This produces the modulating signals that are used to open and close the switches of the first bridge 106a in a conventional manner. The first control circuit 104a is not supplied with power from the first power supply 108a but is supplied with power from a first isolated power supply 112a, This comprises a transformer having at least one input coil 114a connected between the supply and ground lines of the first power supply 108a, and at least one output coil 116a across which the output voltage is provided. This is fed to a first voltage regulator 118a to output a 6 volt and 2 volt supply voltage and a first floating ground. The control circuit 110a, in addition to producing the modulating signals for the first bridge 106a also monitors the current in the motor 102 by receiving an output from a current sensor.

In a similar manner, the bridge driver 106b of the second lane 104b is controlled by a second control circuit 110b indicated in FIG. 1 as microprocessor (micro). This produces the modulating signals that are used to open and close the switches of the second bridge 106b in a conventional manner. The second control circuit 104b is not supplied with power front the second power supply 108b but is supplied with power from a second isolated power supply 112b. This comprises a transformer having at least one input coil 114b connected between the supply and ground lines of the second power supply 108b, and at least one output coil 116b across which the output voltage is provided. This is fed to a second voltage regulator 118b to output a 6 volt and 2 volt supply voltage and a second floating ground. The control circuit 110b, in addition to producing the modulating signals for the second bridge 106b also monitors the current in the motor 102 by receiving an output from a current sensor.

The two control circuits 110a, 110b additionally receive digital signals from the other control circuit 110a, 110b, to allow each control circuit 110a, 110b to monitor the function of the other lane 104a, 104b. These comprise conventional digital signals that vary between a 0 value at or close to the floating ground potential and a 1 value that is at or close to the isolated supply voltage of a nominal 5 volts. The reader will appreciate that these digital values may vary by as much as a volt or two from these nominal values due to noise etc.

The voltages discussed herewith are examples and are not limiting to the invention. For instance, the 6 volts supply voltage and 2 volt floating ground voltage may be different depending on the requirements of the circuit and may have different values. Furthermore, the 5 volt signal which is indicative of the 1 value may be also be any other level, depending on the desire of the designer and the particular design of the circuit.

The applicant has appreciated that in the event of a noise or a sudden voltage spike on one of the two ground lanes, there can be a large difference between the potential of the two ground lanes. This would, if unchecked, in turn cause a large difference in the potential of the two floating grounds. If this is greater than, say, 3 volts, then the two controllers 110a, 110b will not be able to reliably interpret the digital signals they are observing from the other lane.

To overcome this problem, the circuit of FIG. 1 ties the two floating grounds together using a potential divider network. The potential divider network comprises a first resistance 120 connecting the floating ground of the first lane 104a to the associated first ground for the first lane 104a, a second resistance 122 connecting the floating ground of the second lane 104b to the associated second ground for the second lane 104b, and a third resistance 124 connecting the two floating grounds together. Each resistance 120, 122, 124 comprises a resistor, and in this example the first and second resistances 120, 122 are equal and several times the value of the third resistance 124. This network ensures that the two floating grounds are held at similar potentials, and lie midway between the two ground potentials. The exact values chosen will depend on the specific application.

In an ideal case, where the two lane grounds are at the same potential let's say a nominal 0 volts the divider network will hold both floating grounds at the same 0 volt potential. Any digital signal produced by the control circuits 110a, 110b will also be referenced to this 0 volt potential. In a non-ideal situation—let's say the first ground is at a nominal 0 volt and the second ground a nominal 2 volts—then the two floating grounds will both be held close to a nominal 1 volt potential. Because they are close, then they can easily interpret digital signals passed between the control circuits 110a, 110b.

In a further refinement shown in FIG. 1, a Zener diode 126a, 126b is connected in parallel with each of the first and second resistances 120, 122 which will limit the voltage that can be dropped across each resistor to the respective Zener breakdown voltage. This ensures that, in the event of a very large voltage difference between the two grounds, the potential of the floating ground for a lane does not differ from the potential of the lane ground by an amount greater than the Zener breakdown voltage.

In fact, as shown two Zener diodes are provided in series, back to back, to cover the case where the first ground exceeds the second ground as well as the case where the second ground exceeds the first ground. The floating ground cannot differ from the lane ground by an amount greater than the forward bias voltage of one Zener plus the breakdown voltage of the other Zener.

In use, with very small differences in the two lane grounds there will be an even smaller difference between the potential of the two floating grounds. This allows for accurate exchange of digital signals between the lanes as the 0 and 1 levels of the digital signals are referenced to the almost identical floating ground potentials.

With a larger difference, that exceeds the sum of the forward potential and breakdown voltage of the two serial connected Zener diodes across the first and second resistances 120, 122, the two floating grounds will differ by a small amount dependent on the current flowing through the third resistance. This small difference again will not be high enough to cause a failure of the cross lane digital communications—it may reach perhaps 1 volt or less for a short period of time where there is a very high difference in the earth potential of the two lane grounds. This will be a rare event, and likely arises where high currents are flowing and where the earth points are spaced apart in different locations on the vehicle. Importantly the two floating grounds are tied close to the respective lane grounds by the Zener diodes 126a, 126b when this happens. This ensures the amplifiers of the bridge driver 106a, 106b which have a common mode range do not become faulty because the range is not exceeded.

Where a very high potential difference is present, the two floating grounds may differ in potential by an amount large enough to make inter-lane communications faulty because the digital signals cannot be interpreted, but the common mode range of the bridge driver 106a, 106b is not exceeded due to the Zener diodes 126a, 126b so that each lane 104a, 104b will otherwise continue to function correctly, even if the communications with the other lane 104a, 104b fails.

By keeping the two floating earths at substantially the same potential, this allows for only resistive isolation between the two control circuits 104a, 104b which is cheap and reliable and allows for a large number of different interconnects to be established.

FIG. 1 shows the simplest design where the use of two isolated power supplies 112a, 112b. The dotted circles show the isolated power supply 112a, 112b with transformer, the dashed circle highlights the inter-lane communications 128 which can be simple resistive digital communications, and the dot-dashed circles show the potential divider resistor network and Zener diodes required to hold the floating control circuits at the same potential between the two lane grounds.

Where the circuit 100 is used in an automobile, the devices that are floating may include voltage regulators, microcontroller for generating the modulating signals for the bridges, CAN/Flexray interfaces, and TAS interface.

Devices that are not floating are typically: the power supply controller, the motor drive circuit or Bridge Driver (although the digital connections between the micro and BD are floating), any Current sense amplifiers, MOSFET's.

An extra, if small benefit to the design of FIG. 1 is that for very little cost, extra voltages can be generated from the isolated power supply 112a, 112b for each lane allowing the microcontroller core voltage to be generated by the isolated power supply 112a, 112b.

Another benefit is that the isolated power supply 112a, 112b for each lane 104a, 104b does not have a failure mode of putting the main supply voltage Vbat for that lane onto the output as a failure in the isolated power supply 112a, 112b will result in no output. This means that the voltage regulators 118a, 118b no longer require to be capable of withstanding the voltage transients on the Vbat supply for the lane 104a, 104b allowing lower voltage rated devices to be used potentially saving space on the board as well as cost.

Another benefit is that in low voltage conditions in an automobile such as cranking, where the battery supply voltage for a lane is low, the isolated power supply is able to tolerate this without the need for a boost circuit.

Cross Lane Power Provided by Isolated Power Supply Transformer

Figure 2:
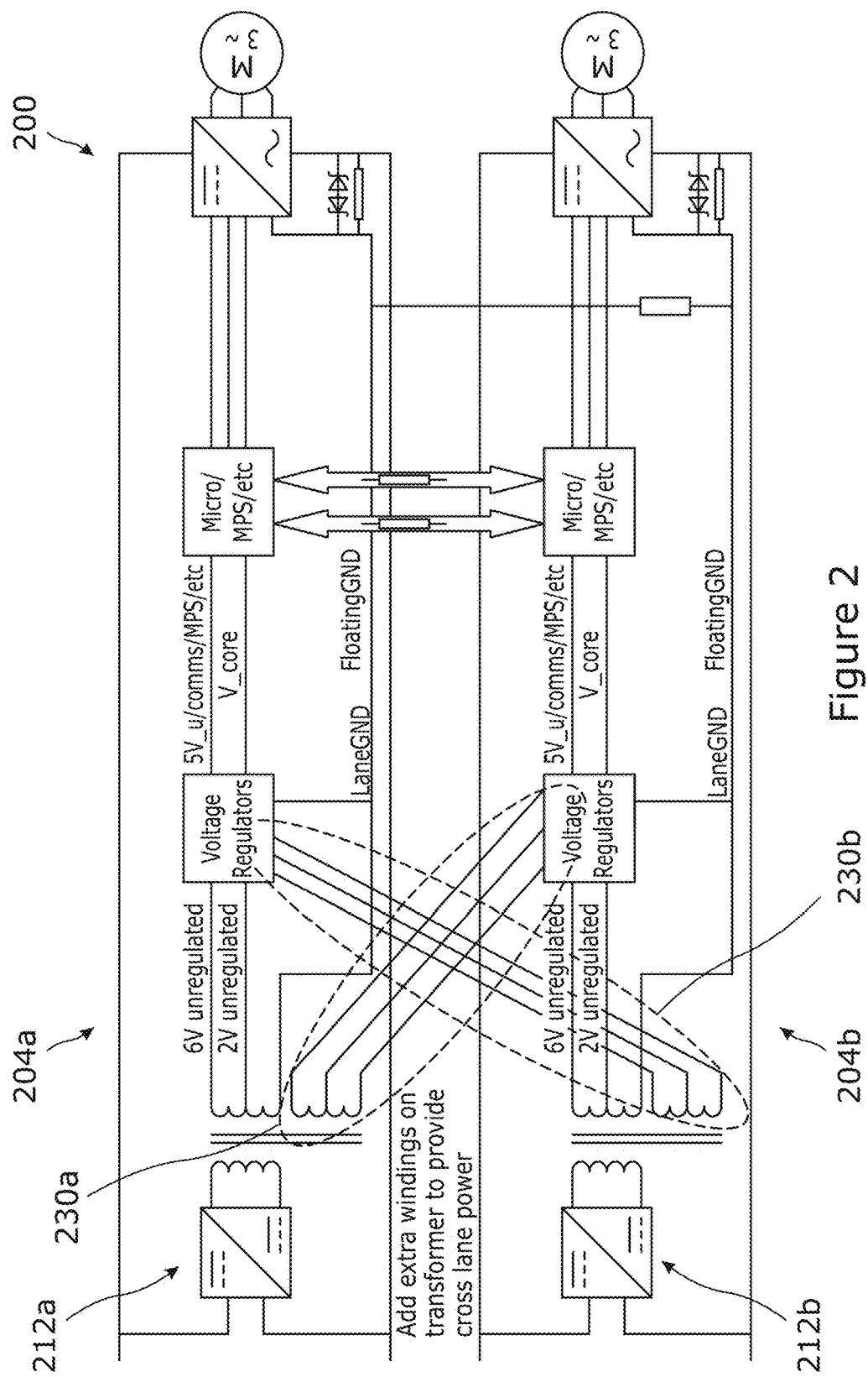
FIG. 2 is second embodiment of a circuit for controlling and driving an electric motor.

FIG. 2 shows an embodiment 200 of a more developed design where the advantages of the isolated power supplies 212a, 212b become greater. For very little extra cost in the transformer, an extra set of windings 230a, 230b can be added for the other lane 204a, 204b (dashed circle). This allows each isolated power supply 212a, 212b to generate two sets of isolated outputs, one of which can be fed across to the other lane 204a, 204b. This means that in the event of a failure of one isolated power supply 212a, 212b, both lanes 204a, 204b may continue to operate, albeit with reduced redundancy. This leads to a greater level of availability after a fault.

Cross Lane Bridge Driver Control Enabled by Lower Cost of Communications

Figure 3:
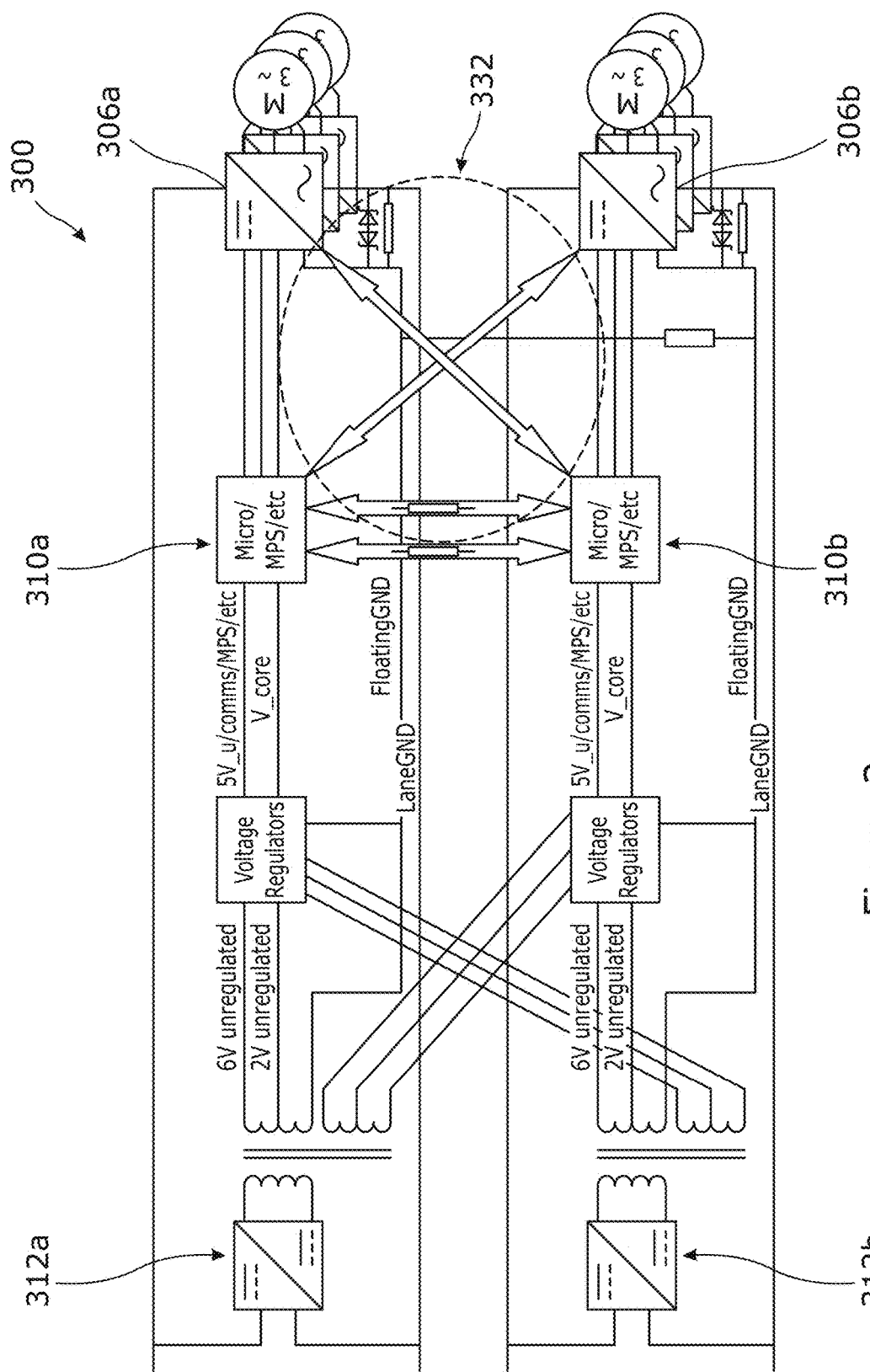
FIG. 3 is third embodiment of a circuit for controlling and driving an electric motor.

FIG. 3 shows a further refinement in which further availability after a microcontroller fault can be achieved by adding inter-lane connections 332 between the microcontrollers 310a, 310b and the bridge drivers 306a, 306b (dashed circle). The benefit here is that in the event of a failure of either microcontroller 310a, 310b, both bridge drivers 306a, 306b are still controlled, and you still have the redundant isolated power supply 312a, 312b so the design 300 will have high availability after the first microcontroller fault. This also enable the use of more motor lanes, although the unit would only have two lanes of microcontroller, the motor could have 4 sets of windings and 4 bridge drivers and bridges giving greater availability after a bridge fault, in this design.

Vehicles With Different Battery Voltages

Figure 4:
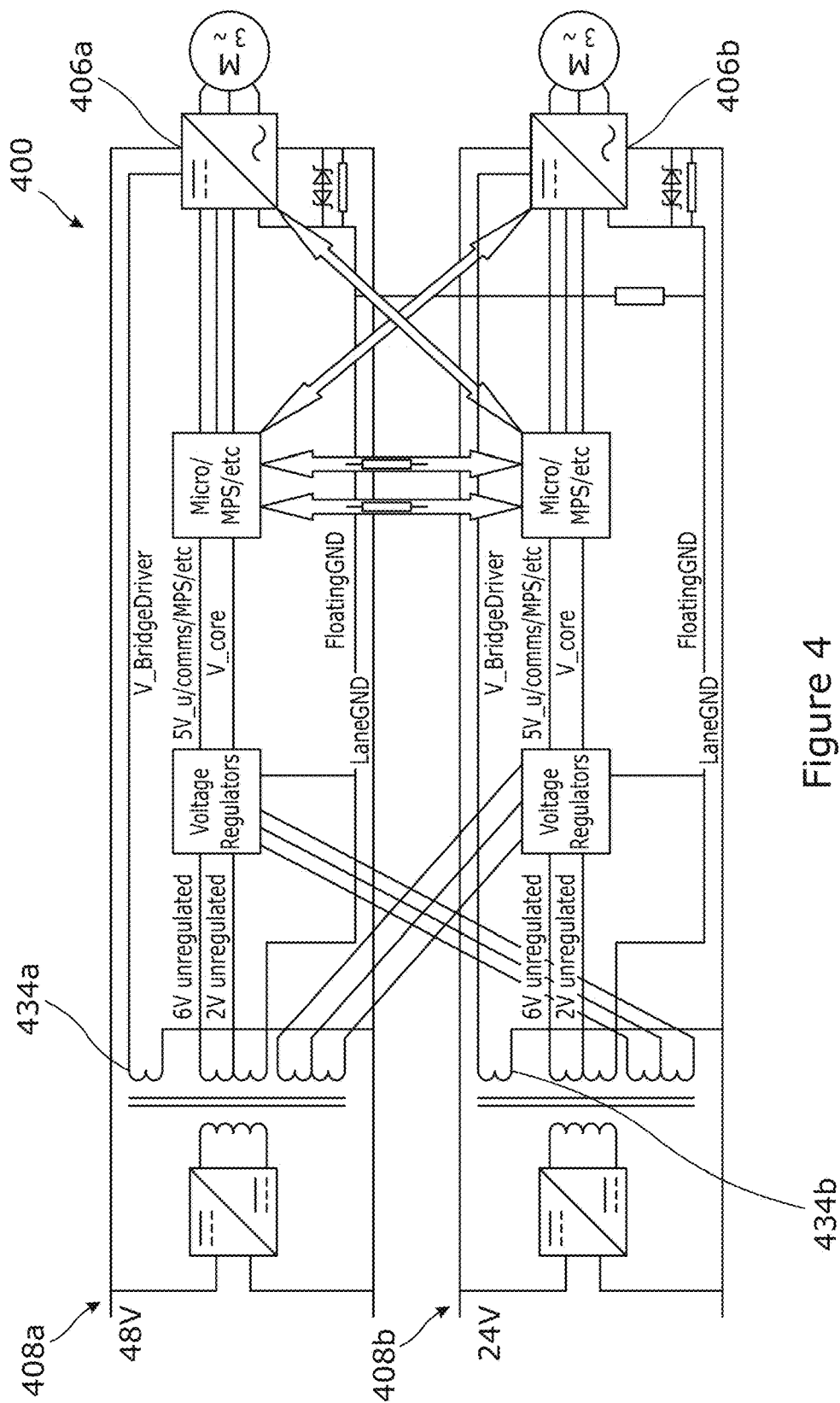
FIG. 4 is fourth embodiment of a circuit for controlling and driving an electric motor.

As shown in the embodiment 400 of FIG. 4, for systems that have different first and second supply voltage 408a, 408b, provided from two independent vehicle batteries with say potential 12V and 48V systems, or 24V systems, the isolated power supply design can be easily adjusted for the different battery voltage. An extra winding 434a, 434b can be added to the transformer to generate the 12V for the bridge driver 406a, 406b, but the MOSFET's continue to operate from the Vbat supply. By adding in the extra 12V supply from the transformer means the bridge driver 406a, 406b is able to operate more efficiently and generate less heat.

Floating Third Lane for Redundant Sensors

Figure 5:
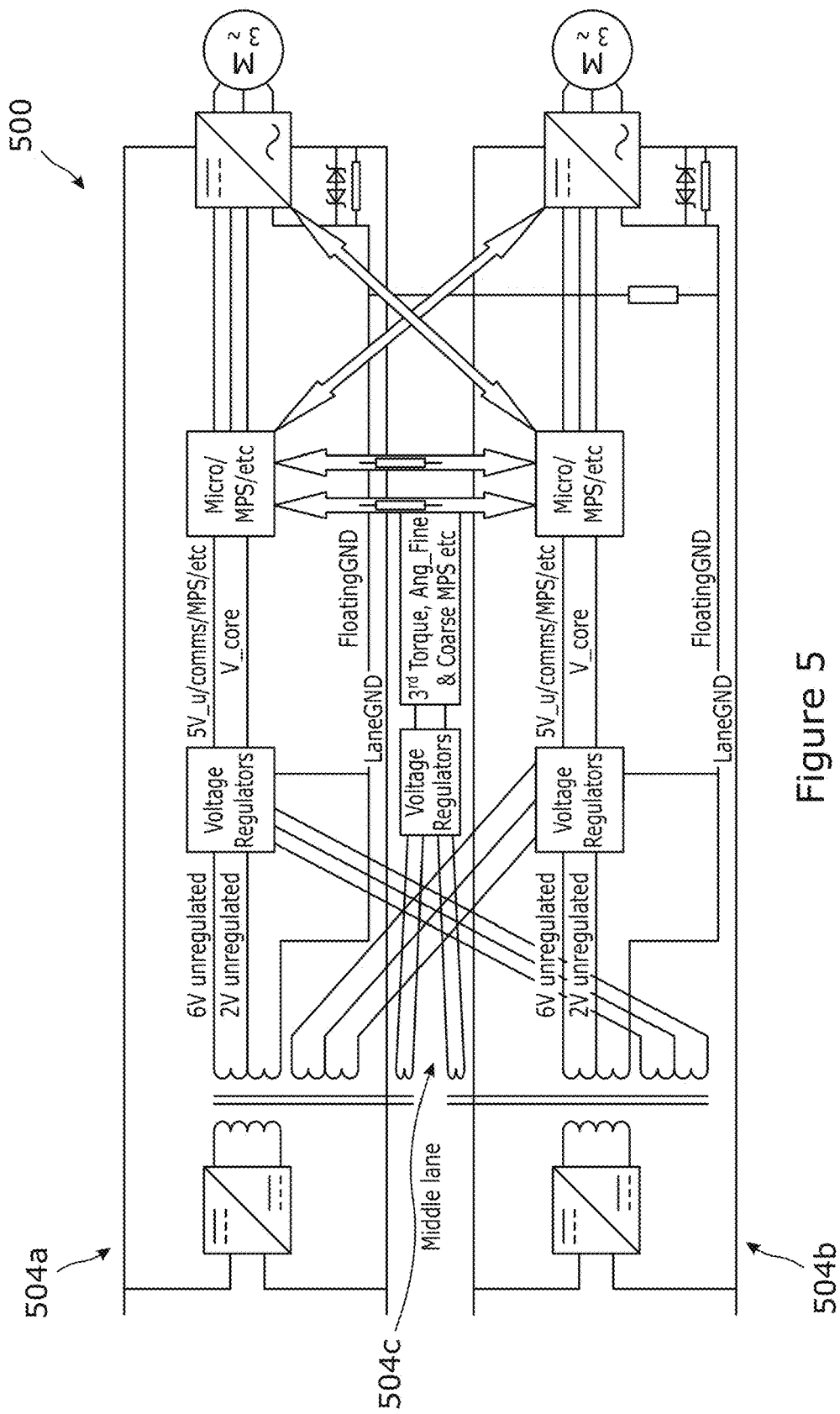
FIG. 5 is a further fifth embodiment of a circuit for controlling and driving an electric motor.

FIG. 5 shows a still further embodiment 500 where an additional third lane 504c is added. This third lane 504c contains one or more extra redundant sensors required for the design, the redundant sensor replicating a first and second sensor associated with each lane 504a, 504b. This achieves a requirement to have redundant sensors after a first sensor fault, which means that a minimum of 3 sensors is required. By placing the extra sensors onto a floating middle lane 504c only a single shared sensor needs to be added which can be used by both lanes 504a, 504b.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An electric circuit for use in the control and drive of at least one electric motor, the electric circuit comprising:
a first lane comprising a first set of motor windings arranged as a plurality of phases, the first set of motor windings being driven by a first motor drive bridge that comprises a network of first drive stage switches that selectively connect each phase of the first lane to a first supply voltage and a first supply lane ground, and further comprising a first control circuit that controls the first drive stage switches, the first control circuit being powered by an isolated first lane power supply that has a first floating ground;
a second lane comprising a second set of motor windings arranged as a plurality of phases, the second set of motor windings being driven by a second motor drive bridge that comprises a network of second drive stage switches that selectively connect each phase of the second lane to a second supply voltage and a second supply lane ground, and further comprising a second control circuit that controls the second drive stage switches, the second control circuit being powered by an isolated second lane power supply that has a second floating ground;
the first control circuit and the second control circuit in use exchanging digital control signals such that the control circuit of each of the first lane and the second lane can monitor the function of the other of the first lane and the second lane; and
wherein the first and second floating grounds and the first and second supply lane grounds are connected together through a potential divider network that holds the first and second floating grounds at a potential that is between the potential of the first and second supply lane grounds for the first and second lanes.

2. The electric circuit according to claim 1 in which the potential divider network comprises a first resistance connecting the first floating ground of the first lane to the associated first supply lane ground for the first lane, a second resistance connecting the second floating ground of the second lane to the associated second supply lane ground for the second lane, and a third resistance connecting the two floating grounds together.

3. The electric circuit according to claim 2 in which the first resistance and the second resistance are each higher than the third resistance.

4. The electric circuit according to claim 2 in which the first resistance and the second resistance are the same.

5. The electric circuit according to claim 2 in which the potential divider network includes one or more Zener diodes which prevent the voltage of a floating ground of a lane deviating from the potential of the associated supply lane ground of the lane by an amount that exceeds a predetermined maximum dependent on the breakdown voltage of the Zener diode.

6. The electric circuit according to claim 5 in which a first Zener diode is provided in parallel with the first resistance to provide a voltage limiting circuit and a second Zener diode is provided in parallel with the second resistance, ensuring that the potential of each floating ground will be limited to have a value that is tied to the potential of the respective supply lane ground by an amount that is dependent on the breakdown voltage of the Zener Diode.

7. The electric circuit according to claim 6 in which two Zener diodes are provided, which are connected facing away from each other in series, the two Zener diodes being connected in parallel with the first resistance.

8. The electric circuit according to claim 6 in which two Zener diodes are provided which are connected facing away from each other in series, the two Zener diodes being connected in parallel with the second resistance.

9. The electric circuit according to claim 6 in which the Zener breakdown voltage of each Zener diode is chosen to be less than the common mode range of any components used in the motor bridge driver of the respective lane.

10. The electric circuit according to claim 9 in which the motor bridge driver of each lane comprises a bridge driver integrated circuit that includes a differential amplifier having a common mode range and the Zener breakdown voltage is chosen to suit the integrated circuit amplifier.

11. The electric circuit according to claim 1 in which the first control circuit of the first lane receives digital signals from the second control circuit of the second lane and also transmits digital signals to the second control circuit of the second lane and the second control circuit of the second lane receives digital signals from the first control circuit of the first lane and also transmit digital signals to the first lane.

12. The electric circuit according to claim 1 in which each of the isolated lane power supplies comprises a transformer having an input coil connected to the respective lane power supply, and an output coil which produces across terminals thereof the supply and floating ground potentials for the respective lane.

13. The electric circuit according to claim 1 in which each of the isolated lane power supplies provides as an output two different supply voltages that are fed to different parts of the control circuit.

14. The electric circuit according to claim 1 in which the output of each isolated lane power supply is passed through a voltage regulator before supplying the respective control circuit.

15. The electric circuit according to claim 12 in which each of the isolated lane power supplies additionally includes an auxiliary independent set of output windings to provide an auxiliary supply voltage that may be used to drive the control circuit of the other lane in the event of a fault of the isolated lane power supply for that other lane.

16. The electric circuit according to claim 1 in which the isolated lane power supplies for each lane provide different supply voltages.

17. The electric circuit according to claim 1 which further includes at least one sensor that is shared between the first and second control circuits and which is powered from a third isolated power supply and has a third supply lane ground that is floating at a voltage dependent on at least one of the first and second floating grounds.

18. The electric circuit according to claim 1 which comprises a part of a vehicle electric power steering system in which the at least one electric motor applies an assistance torque to a part of a vehicle steering assembly that assists a driver in turning a steering wheel of the vehicle.

* * * * *